Patented Sept. 29, 1953

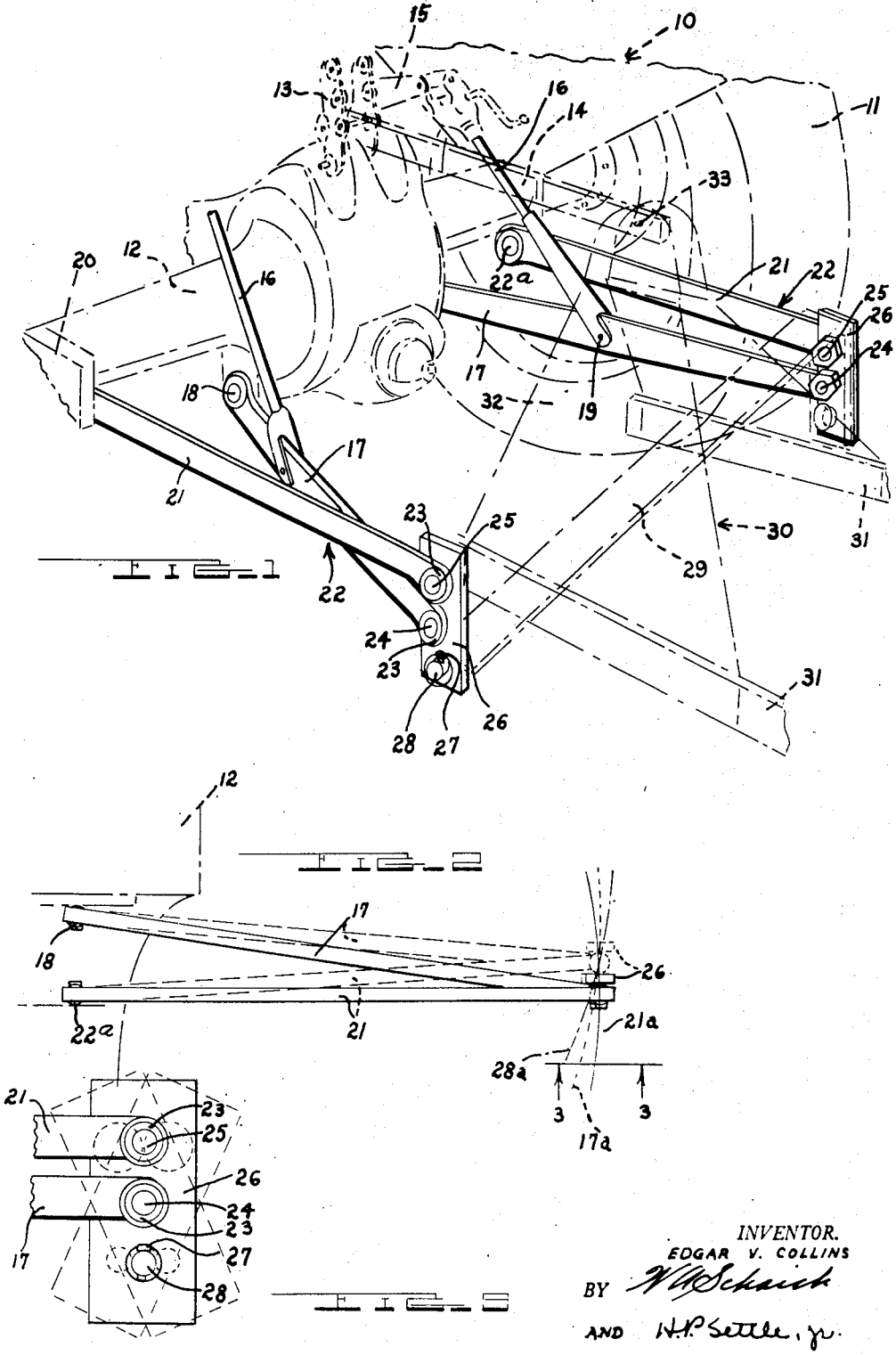

2,653,825

UNITED STATES PATENT OFFICE 2,653,825

TRACTOR IMPLEMENT HITCH

Edgar V. Collins, Ames, Iowa

Application March 17, 1952, Serial No. 276,965

6 Claims. (Cl. 280—33.44)

The present invention relates to a tractor implement hitch and more particularly to a tractor-implement connection wherein the implement is effectively steered about a selected point remote from the actual points of attachment of the implement to the tractor.

The instant application is a continuation-in-part of my earlier filed pending application, Serial Number 165,922, filed June 3, 1950.

As has been explained in my said earlier application, it is desirable to provide a hitch for mounted ground-engaging implements which is effective to steer the implement about an effective steering point located in the vicinity of the tractor rear axle. In certain types of tractors now commercially available, such as the Ford tractor, there are provided implement hitches composed of forwardly converging laterally spaced hitch links pivotally connected at their forward ends to the tractor and at their trailing ends to the implement. As is well-known in the art, such connecting means cause the implement to be effectively steered about a point on the tractor located at the point of theoretical convergence of the links. Conventionally, this point of convergence is located at or in the vicinity of the tractor front axle. As has been explained, with certain types of ground-engaging implements, particularly tillage implements, such as moldboard plows, disc plows, and one-way plows, which create substantial side draft during use, it is preferable to steer the implement about an effective point located in the vicinity of the tractor rear axle, so that the side draft forces are absorbed by the large tractor driving wheels and the side draft is not reflected upon the tractor steering.

The present invention now provides an improved form of tractor-implement connection wherein the effective implement steering point is located in such manner that the side draft forces exerted by the implement do not interfere with tractor steering since the effective implement steering point is located in the vicinity of the tractor rear axle. More particularly, the present invention utilizes a pair of laterally spaced generally forwardly convergent pairs of link elements. The individual hitch link elements of each pair are forwardly divergent with their front ends pivotally connected to the tractor and their trailing ends each connected to a steering crank arm which in turn is pivotally connected to the implement. Each pair of link elements, because of its divergence and its connection to the associated steering crank arm, is subjected during working of the implement to forces which tend to cause the steering crank arm to pivot relative to the implement. In other words, each individual link element is confined for movement in a given arcuate path and the spaced connections of the elements of each pair to a single crank arm causes the crank arm to be pivoted in a predetermined path upon relative tractor-implement movement. The implement is attached to each of the crank arms in spaced relation to the connections of each crank arm to the associated link elements, and pivoting of the crank arm varies the distance of the corresponding portion of the implement from the tractor, so that the implement is turned or steered as though it were connected to the tractor through a single link element pivoted to the tractor at the effective steering point.

It is, therefore, an important object of the present invention to provide an improved tractor-implement linkage which is effective to steer an implement about a steering point located on the tractor in spaced relation to the actual points of tractor-implement connection.

Another important object is the provision of an implement hitch for steering an implement about an effective steering point determined by the angular relationship between the link elements of laterally spaced pairs of such elements.

It is a further object to provide a hitch wherein pairs of individually pivotally disposed, spaced link elements are connected at their spaced trailing ends to an implement through a steering crank arm for coupling the implement to the tractor for movement about an effective steering point located by differential pivoting movement of the link elements.

Still another important object is the provision of an implement hitch including crank arms movably disposed upon laterally spaced portions of an implement frame and each connected to a pair of forwardly divergent link elements differentially pivotable to cause the crank arms to be actuated upon relative tractor-implement movement to thereby steer the implement about an effective hitch point remote from the actual points of tractor-implement connection.

The specific nature of this invention, as well as other objects and advantages thereof, will become apparent to those skilled in the art from the following detailed description, taken in conjunction with the attached sheet of drawings on which, by way of preferred example only, is illustrated one embodiment of this invention.

On the drawings:

Figure 1 is a rear perspective view of a hitch of the present invention utilized in connection with a tractor and an implement, both of which are illustrated in phantom to better illustrate the hitch;

Figure 2 is a fragmentary plan view of the hitch of Figure 1 illustrating the mode of operation thereof; and Figure 3 is a fragmentary side elevational view illustrating the pivotal movement of the hitch steering crank arms.

As shown on the drawings:

In Figure 1 reference numeral 10 refers generally to a tractor of well-known make, such as a Ford tractor, having a pair of laterally spaced rear driving wheels 11 and a rear axle housing 12 interposed between the wheels 11. The rear axle housing 12 is surmounted by the conventional hydraulic control reaction arm 13 interconnected with the control system for the conventional tractor hydraulic system, and a trailing top link 14 is connected to the bracket 13 to extend rearwardly therefrom. The tractor is also provided with a pair of laterally spaced power liftable rock arms 15 adapted to be elevated by the tractor hydraulic system and carrying depending lift arms 16 and a pair of conventional trailing draft links 17 which are universally pivoted, as at 18, to spaced portions of the rear axle housing 12. The draft links 17 are adapted to be power elevated by the tractor hydraulic system by virtue of their pivoted connection at 19 to the lift arms 16.

The tractor rear axle housing is also provided with depending fender brackets 20 laterally spaced outwardly from the pivot points 18 of the draft links 17, and an additional link 21 is pivoted to each of the brackets 20, as at 22a, to extend rearwardly therefrom. The linkage thus includes laterally spaced pairs of draft link elements 17 and 21, the pairs of links being indicated generally at 22.

The extreme trailing ends of the link elements 17 and 21 of each pair 22 are vertically aligned and are provided with spherical-type universal bearings 23 similar to the bearings at the forward ends of the link elements. The bearings 23 of the draft links 17 are adapted to receive therethrough mounting pins 24, while the bearings 23 of the additional link elements 21 are adapted to receive the pins 25 therethrough. The pins 24 and 25 are spaced longitudinally of a vertically extending steering crank arm 26. A crank 26 is provided for each pair 22 of links and the arms are apertured adjacent their lower extremities, as at 27, to receive therethrough mounting pins 28 carried by and laterally projecting beyond the lateral extremities of a cross shaft 29 of an implement 30. The cross shaft 29 is supported upon the beams 31 of the implement 30, and the beams also carry an upstanding A-frame 32 pivotally joined, as at 33, to the trailing end of the top link 14.

From a study of Figures 1 and 2, it will be appreciated that the pairs of links 22, considered jointly, are forwardly convergent, while the individual link elements 17 and 21 of each pair of links are forwardly divergent. Upon relative tractor-implement movement in a lateral plane, the link 17 is constrained for movement about its point of pivoted connection 18 to the tractor rear axle housing 12, while the additional link element 21 is also constrained for movement in an arcuate path about its point of connection 22a to the rear axle housing 12. The path of movement of the rear ends of the links 17 and 21 is diagrammatically represented by lines 17a and 21a, respectively, in Figure 2. Due to the differential arcuate paths 17a and 21a followed by the link elements 17 and 21, respectively, the portion of the vertical arm 26, attached to the implement mounting pins 28, must move through an arcuate path indicated generally at 28a in Figure 2.

The pivotal movement of the crank arm 26 is illustrated in Figure 3 from which it will be appreciated that the arm 26 is actually pivoted about the pin 24 securing the draft links 17 to the implement. The arc 28a through which the pin 28 travels has an effective center located in the vicinity of the tractor rear axle.

Since the pins 28 travel in paths 28a effectively centered along the longitudinal center line of the tractor in the vicinity of (or slightly ahead of) the rear axle housing, the implement is accordingly steered as though it were attached to the tractor by a single draft link pivotally connected at the center about which the pins travel. The exact point about which the pins travel is actually an instant center and may vary as the implement moves laterally. Therefore, the effective steering point is the locus of the instant center as it travels in its predetermined path. Thus side draft forces of the implement are centered in the vicinity of the tractor rear axle housing and the implement behaves as though it were being steered from an effective steering point located in the same vicinity.

The present invention thus makes possible the employment of a pair of laterally spaced pairs of link elements effective to steer the implement about a point removed from the actual points of tractor-implement connection. In other words, the arcuate paths of movement of the pairs of hitch elements determine the path of movement of an implement carried by the crank arms joining the elements, and the differential pivoting movement of the elements causes steering of the implement about the desired effective steering point.

It will, of course, be understood that various details of construction may be varied through a wide range without departing from the principles of this invention and it is, therefore, not the purpose to limit the patent granted hereon otherwise than necessitated by the scope of the appended claims.

I claim:

1. In an implement-tractor linkage, laterally spaced pairs of laterally swingable hitch link elements attachable at their forward ends to the tractor, a crank arm pivotally joining the free rear ends of each pair of elements in spaced relation and adapted for connection to an implement in spaced relation to the points of connection of the crank arm to the link elements, whereby said crank arms are pivoted by differential movement of said elements upon relative tractor-implement movement to steer the implement laterally about an effective steering point different from the points of connection of the elements to the implement.

2. In an implement-tractor linkage a pair of laterally spaced forwardly convergent draft links having their forward ends adapted for attachment to a tractor for free lateral swinging movement, vertically extending crank arms pivotally attached at the rear ends of said links and attachable at one end thereof to an implement, and additional link arms attached at their rear ends to the other ends of said crank arms and adapted for attachment at their forward ends to the tractor in spaced relation to the attachment of said draft links to the tractor, whereby said link arms limit the pivoting movement of said crank arms relative to said draft links upon lateral tractor-implement movement.

3. An implement hitch for tractors comprising a pair of laterally spaced hitch link structures each including laterally spaced link elements having corresponding end portions adapted for pivotal attachment to the tractor, crank arms joining the other ends of each pair of said elements, and means on said crank arms spaced from said other ends of said elements for attaching an implement thereto, whereby relative lateral implement-tractor movement causes steering of said implement through said crank arms and said elements.

4. An implement-tractor connection comprising laterally spaced pairs of forwardly divergent link elements having their forward ends attachable to the tractor in laterally spaced relation, and a vertically extending steering arm joining the rear ends of each pair of elements respectively and having means pivotally attachable to the implement, the elements of each pair being effective to confine lateral movement of the associated steering arm means to an arcuate path about a point located on the tractor and determined by the angular relationship of the elements of each of said pairs.

5. An implement hitch for joining a tractive unit to a trailing implement unit for articulated movement comprising a pair of crank arms pivotally attachable to one of said units for angular steering movement relative thereto, and laterally spaced pairs of link elements pivotally attachable to the other of said units and pivoted to said crank arms, the elements of each of said pairs being laterally spaced at their points of attachment to said other unit so that relative lateral articulated movement of said units causes said implement unit to be steered about an effective steering point different from said points of attachment.

6. A lift-type implement hitch for use with a tractor having a pair of laterally spaced trailing power-liftable hitch links universally pivotally attached to the rear end of the tractor comprising a vertical crank arm having a medial portion pivotally attachable to the trailing end of each of said hitch links respectively, means adjacent one extremity of each of said crank arms for pivotally securing the same to an implement for relative vertical movement, and an additional link pivotally attachable to the other extremity of each of said crank arms respectively and projecting forwardly therefrom for pivotal attachment to the tractor in laterally spaced relation to the corresponding ends of said hitch links.

EDGAR V. COLLINS.

References Cited in the file of this patent
UNITED STATES PATENTS

| Number | Name | Date |
| --- | --- | --- |
| 1,877,958 | Paul | Sept. 20, 1932 |
| 2,223,002 | Ferguson | Nov. 26, 1940 |
| 2,309,750 | Carrington | Feb. 2, 1943 |
| 2,561,032 | Onfrey | July 17, 1951 |